(12) United States Patent
Li (10) Patent No.: US 9,781,112 B2
(45) Date of Patent: Oct. 3, 2017

(54) DATA ACCESS PRIVILEGE PROCESSING METHOD AND APPARATUS

(71) Applicants: Beijing Lenovo Software Ltd., Beijing (CN); Lenovo (Beijing) Co., Ltd., Beijing (CN)

(72) Inventor: Dong Li, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 253 days.

(21) Appl. No.: 14/229,447

(22) Filed: Mar. 28, 2014

(65) Prior Publication Data

US 2015/0074766 A1    Mar. 12, 2015

(30) Foreign Application Priority Data

Sep. 9, 2013   (CN) .......................... 2013 1 0407436

(51) Int. Cl.
*G06F 21/00* (2013.01)
*H04L 29/06* (2006.01)

(52) U.S. Cl.
CPC .................................... H04L 63/10 (2013.01)

(58) Field of Classification Search
None
See application file for complete search history.

(56) References Cited

U.S. PATENT DOCUMENTS

| 7,290,072 | B2 * | 10/2007 | Quraishi | G07F 17/3202 463/22 |
|---|---|---|---|---|
| 7,704,147 | B2 * | 4/2010 | Quraishi | G07F 17/32 463/17 |
| 7,819,750 | B2 * | 10/2010 | Lam | G07F 17/3202 463/29 |
| 8,265,598 | B2 | 9/2012 | Kim et al. | |
| 8,428,929 | B2 * | 4/2013 | Sakthikumar | G06F 21/572 703/23 |

(Continued)

FOREIGN PATENT DOCUMENTS

| CN | 101128052 A | 2/2008 |
|---|---|---|
| CN | 101815094 A | 8/2010 |

OTHER PUBLICATIONS

First Chinese Office Action regarding Application No. 201310407436.8 dated Dec. 16, 2016. English translation provided by Unitalen Attorneys at Law.

*Primary Examiner* — Jeffery Williams
(74) *Attorney, Agent, or Firm* — Harness, Dickey & Pierce, P.L.C.

(57) ABSTRACT

An information processing method and apparatus are provided. The method is applicable to a first electronic device, where information about a first preset relationship between the first electronic device and a second electronic device is recorded upon detection of the first preset relationship. If it is judged from the recorded information on the first preset relationship that the first preset relationship between the second electronic device and the first electronic device satisfies a first preset condition, then the second electronic device is authorized for a data access privilege so that the second electronic device has a privilege to access data in the first electronic device. This method can lower the complexity of the data access and improve the convenience of the data access between the electronic devices.

10 Claims, 4 Drawing Sheets

(56) References Cited

U.S. PATENT DOCUMENTS

| | | | |
|---|---|---|---|
| 2004/0254006 A1* | 12/2004 | Lam | G07F 17/3202 |
| | | | 463/16 |
| 2004/0254013 A1* | 12/2004 | Quraishi | G07F 17/32 |
| | | | 463/29 |
| 2004/0254014 A1* | 12/2004 | Quraishi | G07F 17/3202 |
| | | | 463/29 |
| 2005/0021780 A1 | 1/2005 | Beyda | |
| 2008/0045189 A1 | 2/2008 | Kim et al. | |
| 2014/0101345 A1* | 4/2014 | Ranta | G06F 13/4081 |
| | | | 710/16 |

\* cited by examiner

DATA ACCESS PRIVILEGE PROCESSING METHOD AND APPARATUS

CROSS REFERENCE TO RELATED APPLICATION

This application claims priority to Chinese Patent Application No. 201310407436.8, entitled "INFORMATION PROCESSING METHOD AND APPARATUS", filed on Sep. 9, 2013 with State Intellectual Property Office of PRC, which is incorporated herein by reference in its entirety.

FIELD

The disclosure relates to the field of information interaction and in particular to an information processing method and apparatus.

BACKGROUND

An increasing number of mobile phones, computers and other electronic devices emerge along with the advancement of sciences and technologies. The same family or the same user may possess a number of electronic devices at the same time. In order to be capable of sharing data, the data can be accessed between the different electronic devices in a wired or wireless manner. However, for security of the data in a practical application, generally the devices have to be registered with each other; or an electronic device will allow registration/log-in verification to be passed only after an access privilege of another electronic device is set manually on the electronic device, or will allow a data access by another electronic device for which an access privilege is set. However the scheme of registration/log-in or manual setting of an access privilege may suffer from a complicated and troublesome process.

SUMMARY

In view of this, the disclosure provides an information processing method and apparatus so as to lower the complexity of data access.

In order to achieve the foregoing object, the disclosure provides an information processing method, applicable to a first electronic device, the method including:

recording information about a first preset relationship between a second electronic device and the first electronic device upon detection of the first preset relationship between the second electronic device and the first electronic device, where the first electronic device are capable of forming a second preset relationship with the second electronic device, and the second preset relationship is a connection established by the second electronic device with the first electronic device upon being authorized by the first electronic device for a data access, and the first preset relationship is different from the second preset relationship;

judging from the recorded information about the first preset relationship between the first electronic device and the second electronic device whether the first preset relationship between the second electronic device and the first electronic device satisfies a first preset condition; and authorizing the second electronic device for a data access privilege in a case that the first preset relationship between the second electronic device and the first electronic device satisfies the first preset condition so that the second electronic device has a privilege to access data in the first electronic device.

Preferably, the detection of the first preset relationship between the second electronic device and the first electronic device includes:

detecting that the second electronic device occupies a resource of the first electronic device.

Preferably, the detecting that the second electronic device occupies a resource of the first electronic device includes:

detecting that the second electronic device is charged by the first electronic device; or detecting that the second electronic device outputs an image using a display unit of the first electronic device; or detecting an access of the second electronic device to a first indicated storage sub-space in a storage space of the first electronic device, where the first storage sub-space is a part of the storage space.

Preferably, the judging whether the first preset relationship between the second electronic device and the first electronic device satisfies the first preset condition includes:

judging whether a duration that the first preset relationship is held between the second electronic device and the first electronic device reaches a preset duration; and/or judging whether the number of times that the first preset relationship is held between the second electronic device and the first electronic device reaches a preset number of times; and/or judging whether the amount of resources obtained by the second electronic device from the first electronic device while the first preset relationship is held between the second electronic device and the first electronic device reaches a preset value.

Preferably, the method further includes:

receiving authorization information, sent from the second electronic device, including information about at least one third electronic device authorized by the second electronic device for a data access privilege; and authorizing the third electronic device for the data access privilege according to the authorization information.

Preferably, the authorizing the second electronic device for the data access privilege includes:

creating an association relationship between the first electronic device and the second electronic device and storing the association relationship, where the association relationship is used to indicate that the second electronic device has the privilege to access the data in the first electronic device.

In another aspect, the disclosure provides an information processing apparatus, applicable to a first electronic device, the apparatus including:

a storage unit configured to record information about a first preset relationship between a second electronic device and the first electronic device upon detection of the first preset relationship between the second electronic device and the first electronic device, where the first electronic device are capable of forming a second preset relationship with the second electronic device, and the second preset relationship is a connection established by the second electronic device with the first electronic device upon being authorized by the first electronic device for a data access, and the first preset relationship is different from the second preset relationship;

a judgment unit configured to judge from the recorded information about the first preset relationship between the first electronic device and the second electronic device whether the first preset relationship between the second electronic device and the first electronic device satisfies a first preset condition; and a first privilege setting unit configured to authorize the second electronic device for a data access privilege in a case that the first preset relationship between the second electronic device and the first electronic device satisfies the first preset condition so that the second electronic device has a privilege to access data in the first electronic device.

Preferably, the storage unit includes:

a storage sub-unit configured to record information about occupancy of a resource of the first electronic device by the second electronic device upon detection occupancy of the resource of the first electronic device by the second electronic device.

Preferably, the storage sub-unit includes:

a first storage sub-unit configured to record information about charging the second electronic device by the first electronic device upon detecting that the second electronic device is charged by the first electronic device; or a second storage sub-unit configured to record information about use of a display unit of the first electronic device by the second electronic device to output an image upon detecting that the second electronic device outputs an image using the display unit of the first electronic device; or a third storage sub-unit configured to record information about an access of the second electronic device to a first indicated storage sub-space in a storage space of the first electronic device upon detection of the access of the second electronic device to the first storage sub-space in the first electronic device, where the first storage sub-space is a part of the storage space.

Preferably, the judgment unit includes:

a judgment sub-unit configured to judge from the recorded information about the first preset relationship between the first electronic device and the second electronic device whether a duration that the first preset relationship is held between the second electronic device and the first electronic device reaches a preset duration; and/or whether the number of times that the first preset relationship is held between the second electronic device and the first electronic device reaches a preset number of times; and/or whether the amount of resources obtained by the second electronic device from the first electronic device while the first preset relationship is held between the second electronic device and the first electronic device reaches a preset value.

Preferably, the apparatus further includes:

a reception unit configured to receive authorization information, sent from the second electronic device, including information about at least one third electronic device authorized by the second electronic device for a data access privilege; and a second privilege setting unit configured to authorize the third electronic device for the data access privilege according to the authorization information.

Preferably, the first privilege setting unit includes:

a first privilege setting sub-unit is configured to, in a case that the first preset relationship between the second electronic device and the first electronic device satisfies the first preset condition, create an association relationship between the first electronic device and the second electronic device and store the association relationship, where the association relationship is used to indicate that the second electronic device has the privilege to access the data in the first electronic device.

As can be seen from the foregoing technical solutions, as compared with the conventional technology, the information about the first preset relationship is recorded when the first electronic device is in the first preset relationship with the second electronic device. If it is judged from the recorded information on the first preset relationship that the first preset relationship between the second electronic device and the first electronic device satisfies the first preset condition, then the second electronic device is authorized for the data access privilege so that the second electronic device has the privilege to access the data in the first electronic device. Thus the second electronic device, in need for accessing the data of the first electronic device, does not perform any account and password registration, log-in or other complicated operations, thereby lowering the complexity of the data access and improving the convenience of the data access between the electronic devices.

BRIEF DESCRIPTION OF THE DRAWINGS

In order to describe more clearly the technical solutions in the embodiments of the disclosure or in the conventional technology, the drawings to be used in the description of the embodiments or the conventional technology will be described briefly, and obviously the drawings in the following description are illustrative of only some embodiments of the disclosure, and those ordinarily skilled in the art can derive from these drawings other drawings without any inventive effort. In the drawings.

DETAILED DESCRIPTION

The technical solutions in the embodiments of the disclosure will be described below clearly and fully with reference to the drawings in the embodiments of the disclosure, and apparently the described embodiments are only a part but not all of the embodiments of the disclosure. Based upon the embodiments of the disclosure, all the other embodiments derived by those ordinarily skilled in the art without any inventive effort shall come into the scope of the disclosure.

An embodiment of the disclosure discloses an information processing method with which the convenience and efficiency of data access can be improved.

Figure 1:
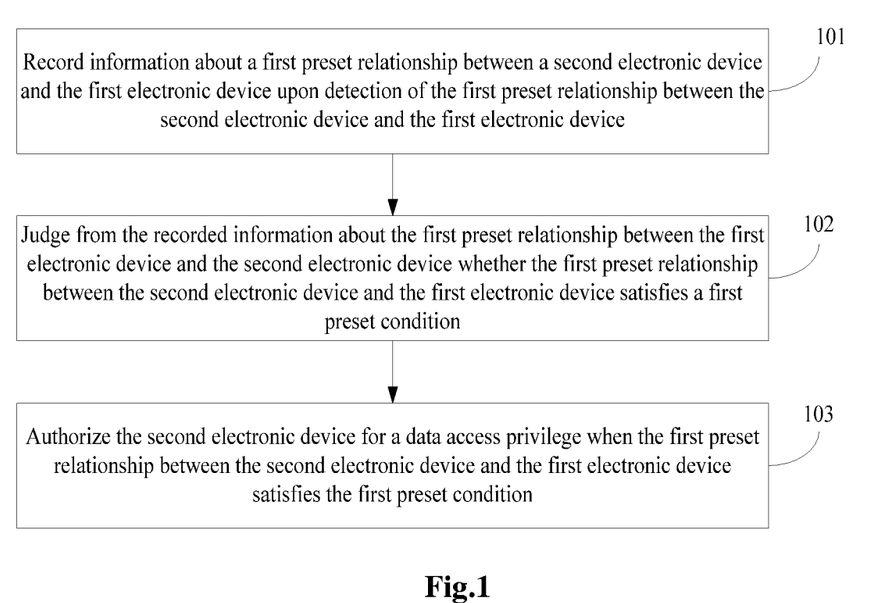
FIG. 1 illustrates a schematic flow chart of an embodiment of an information processing method according to the disclosure.

Referring to FIG. 1, a schematic flow chart of an embodiment of an information processing method according to the disclosure is illustrated. The method according to this embodiment is applicable to a first electronic device which can be a notebook computer, a desktop computer, a PAD, a mobile phone or another electronic device. The method according to this embodiment includes steps 101 to 103.

The step 101 is to record information about a first preset relationship between a second electronic device and the first electronic device upon detection of the first preset relationship between the second electronic device and the first electronic device.

The first electronic device can be in a second preset relationship with the second electronic device, and the second preset relationship is a connection established by the second electronic device with the first electronic device upon being authorized by the first electronic device for a data access. In the case that the second electronic device is authorized by the first electronic device for data access, if the second electronic device needs to access data in the first electronic device, the first electronic device can establish the connection with the second electronic device upon judging that the second electronic device has a data access privilege. For example, the second electronic device has a log-in account and password authorized by the first electronic device, and the second electronic device establishes the connection with the first electronic device using the account and the password.

The first preset relationship is different from the second preset relationship. In other words, the first preset relationship between the second electronic device and the first electronic device is independent of whether the second electronic device is authorized by the first electronic device for the data access privilege.

In this embodiment, whenever it is detected that the first preset relationship exists between the second electronic device and the first electronic device, the first electronic device records the information about the first preset relationship with the second electronic device, for example, records information about a particular type of the first preset relationship between the first electronic device and the second electronic device, a moment when the first preset relationship is generated, a duration for which the current first preset relationship is maintained, As can be appreciated, in this embodiment, the second electronic device can be a device of the same type as the first electronic device or can be a device of a different type. For example, the first electronic device can be a computer, and the second electronic device can be a mobile phone; or both the first electronic device and the second electronic device are tablet computers, etc.

The step 102 is to judge from the recorded information about the first preset relationship between the first electronic device and the second electronic device whether the first preset relationship between the second electronic device and the first electronic device satisfies a first preset condition.

The step 103 is to authorize the second electronic device for a data access privilege in a case that the first preset relationship between the second electronic device and the first electronic device satisfies the first preset condition.

The first preset condition corresponds to the first preset relationship, and the first preset condition changes accordingly when there is a change to the first preset relationship.

It is judged, from the information currently recorded in the first electronic device about the first preset relationship with the second electronic device, whether the recorded first preset relationship satisfies the first preset condition. If the recorded first electronic device satisfies the first preset condition, which indicates that the second electronic device is qualified for a privilege to access the first electronic device, then the first electronic device authorizes the second electronic device for the data access privilege, so that the second electronic device has the privilege to access data in the first electronic device.

In numerous cases, when two electronic devices are used by a same user, belong to a same family or the same department or the like, interaction between these two electronic devices will be relatively frequent. Thus a preset relationship, i.e., the first preset relationship, can be predetermined, and the first electronic device authorizes the second electronic device for a data access privilege upon judging that the first preset relationship existing between the second electronic device and the first electronic device satisfies the first preset condition, so that the second electronic device has the privilege to access the first electronic device, to avoid the account registration or other operations for the second electronic device in subsequent access to the first electronic device.

In an embodiment of this application, the information about the first preset relationship is recorded when the first electronic device has the first preset relationship with the second electronic device. If it is judged from the recorded information on the first preset relationship that the first preset relationship between the second electronic device and the first electronic device satisfies the first preset condition, then the second electronic device is authorized for the data access privilege so that the second electronic device has the privilege to access the data in the first electronic device, and as such the second electronic device, in need for accessing the data of the first electronic device, does not perform any account and password registration, log-in or other complicated operations, thereby lowering the complexity of the data access and improving the convenience of the data access between the electronic devices.

In an embodiment of this application, the first electronic device can authorize the second electronic device for the data access privilege in a number of ways, so long as the second electronic device can have the privilege to access the first electronic device. For example, the first electronic device can send an access indicator to the second electronic device to indicate that the second electronic device has the privilege to access the data of the first electronic device. In another example, the first electronic device shares information about authorizing the second electronic device for the data access privilege, and the second electronic device can obtain the shared information of the first electronic device so that the second electronic device is aware of the authorization by the first electronic device for the data access privilege. In still another example, the first electronic device can also authorize the second electronic device for the data access privilege by recording an identifier of the second electronic device, and in the meantime, in order to make the second electronic device aware of authorization information, the first electronic device can store the authorization information into a file of the second electronic device. In a further example, the first electronic device can set relevant data visible to the second electronic device while displaying or alerting about the second data on the second electronic device in a different pattern from a pattern in which local data of the second electronic device is displayed or alerted about, so that the data on the first electronic device can be located and retrieved for the second electronic device, thereby improving the convenience of the data access between the electronic devices. The data to which the authorization by the first electronic device relates can, but not limited to, take the form of a file, a file folder or a disk letter.

The first electronic device can also authorize the second electronic device for the data access privilege by marking, on the first electronic device, the second electronic device as an authorized device, without transmitting any information to the second electronic device, thereby decrease data transmission and alleviating resource consumption. Thus the first electronic device identifies the second electronic device as an authorized device and also can accept a data access request of the second electronic device upon reception of the data access request of the second electronic device. Optionally, the first electronic device can create an association relationship between the first electronic device and the second electronic device and stores the association relationship, where the association relationship is used to indicate that the second electronic device has the privilege to access the data in the first electronic device. The first electronic device can determine from the stored association relationships which electronic devices have the privilege to access the data in the first electronic device. Optionally, information of the second electronic device authorized for the data access privilege is displayed or alerted about on the first electronic device to facilitate checking and management of the authorized device(s); optionally, an ongoing data access of the second electronic device, authorized by the first electronic device for the data access privilege, to the first electronic device is displayed or alerted about on the first electronic device to facilitate checking and management of data access status of the authorized device(s); and optionally, a function to cancel an ongoing data access of the second electronic device, authorized by the first electronic device for the data access privilege, to the first electronic device is provided on the first electronic device, and in an implementation thereof, a data transmission cancellation button is provided in a display interface, and a read or write privilege of data being accessed is set to be unreadable or non-writable by clicking on the button, to cancel the authorization for the data access, take a remedy measure rapidly and improve the security of the data access when there is an inappropriate authorization, a malicious access or an operational error.

In view of the security of data, a user will generally not allow a stranger to access data in his or her electronic device through another electronic device, and for the same user or users of the same family, it may be troublesome to set access privileges in different electronic devices by registering accounts or passwords one by one. In view of a use habit for a user of an electronic device, the first preset relationship which is predetermined can be that the second electronic device occupies a resource of the first electronic device. Upon detection of occupancy of a resource of the first electronic device by the second electronic device, it is determined that there is a first preset relationship between the second electronic device and the first electronic device, and information about the resource occupied by the second electronic device is recorded.

The resource of the first electronic device can be a screen, an interface, a storage space, an amount of power, etc., of the electronic device. Generally a user of the first electronic device can allow the second electronic device to occupy the resource of the first electronic device only if a user of the second electronic device is the same user as or has a family relationship or a friend relationship with the user of the first electronic device. Thus the occupancy of the resource of the first electronic device by the second electronic device is taken as a condition for the second electronic device to be authorized by the first electronic device for the data access.

Further to any of the foregoing embodiments, in order to enhance the security of data, the information about the first preset relationship needs to be recorded upon detection of the first preset relationship between the second electronic device and the first electronic device, and before the second electronic device is authorized for the data access privilege, it needs to be judged from the recorded information about the first preset relationship whether the first preset relationship between the second electronic device and the first electronic device satisfies the first preset condition, and the second electronic device is authorized for the data access privilege only if the first preset relationship between the second electronic device and the first electronic device satisfies the first preset condition. Therefore, an authorization as a result of a misjudgment is avoided and the security of the data in the first electronic device is improved.

The first preset condition can be whether a preset duration is reached, and then it can be judged whether a duration that the first preset relationship is held between the second electronic device and the first electronic device reaches the preset duration. The second electronic device can be authorized for the data access privilege when the duration of the first preset relationship reaches the preset duration, where the duration that the first preset relationship is held between the first electronic device and the second electronic device is a cumulative duration which refers to the total duration of the currently recorded first preset relationship between the first electronic device and the second electronic device.

For example, when the first preset relationship between the second electronic device and the first electronic device is detected for a first time, the first preset relationship is maintained for a first duration, and then the duration that the first preset relationship is held between these two electronic devices is recorded as the first duration; and for a second time, the duration of the first preset relationship between the second electronic device and the first electronic device is a second duration, and the duration of the first preset relationship is recorded as the second duration; and then the duration that the first preset relationship is held between the second electronic device and the first electronic device can be known from record results as the first duration plus the second duration.

The first preset condition can alternatively be a preset number of times. Accordingly, it can be judged whether the number of times that the first preset relationship is held between the second electronic device and the first electronic device reaches the preset number of times. The first electronic device authorizes the second electronic device authorized for the data access privilege when the number of times that the first preset relationship is held between the second electronic device and the first electronic device reaches the preset number of times.

For example, the preset number of times is 5 times, and the first electronic device authorizes the second electronic device authorized for the data access privilege if the number of times that the first preset relationship is held between the second electronic device and the first electronic device reaches 5 times.

Furthermore, it can be further judged whether the first preset relationship between the second electronic device and the first electronic device satisfies the first preset condition by judging whether the amount of resources obtained by the second electronic device from the first electronic device reaches a preset value while the first preset relationship is held between the second electronic device and the first electronic device. The second electronic device is authorized for the data access privilege when the amount of resources obtained by the second electronic device from the first electronic device reaches the preset value. The amount of obtained resources can be a cumulative amount, for example, the total amount of obtained resources while the first preset relationship is held for a number of times. Of course, the second electronic device can also be authorized for the data access privilege when it is detected for one time that the first preset relationship is held between the second electronic device and the first electronic device and at the same time the amount of resources obtained by the second electronic device from the first electronic device reaches the preset value while the first preset relationship is held for this time. As compared with the scheme of judgment against the preset number of times, this scheme of judgment can avoid frequent establishment of the first preset relationship with the first electronic device in a malicious manner for the purpose of authority.

In a practical application, it can alternatively be judged whether the first preset relationship between the second electronic device and the first electronic device satisfies the first preset condition in a combination of the foregoing schemes to further prevent a user from maliciously establishing the first preset relationship using the second electronic device for the purpose of the data access privilege. For example, it can be judged from the recorded information about the first preset relationship whether the number of times that the first preset relationship is held between the second electronic device and the first electronic device reaches the preset number of times and whether the duration that the first preset relationship is held between the first electronic device and the second electronic device reaches the preset duration, and the second electronic device will be authorized for the data access privilege only if both of these two conditions are satisfied.

In a practical application, the first preset relationship may also be held between the first electronic device and the second electronic device in the case that the users of the electronic devices are strangers to each other or there is no intimate relationship between the users of the electronic devices, but in this case, there is a large interval at which the first preset relationship is held between the first electronic device and the second electronic device, that is, there is a large interval at which the first preset relationship between the first electronic device and the second electronic device is detected for two consecutive times. Thus in order to avoid the second electronic device from being authorized due to a misjudgment, the first preset relationship detected at different time instances can be weighted in a way that the closer the time instance when the first preset relationship is generated is to the current time instance, the larger the weight corresponding to the information about the first preset relationship is.

Accordingly, it can be judged whether the information about the first preset relationship satisfies the first condition by weight-averaging the recorded information about the first preset condition according to the weights corresponding to the recorded information about the first preset condition and judging whether the weight-averaged first preset relationship satisfies the first condition. The second electronic device can be authorized for the data access privilege if the weight-averaged first preset relationship satisfies the first condition.

For example, when the first preset condition is that the duration of the first preset relationship satisfies the preset duration, then weights corresponding to the durations of the first preset relationship detected at different time instances can be set, the different durations can be weight-averaged by the weights corresponding to the durations, and it can be judged whether the weight-averaged duration reaches the preset duration by comparison. For example, it is assumed that it is recorded at a first time instance that the duration that the first preset relationship is held between the first electronic device and the second electronic device is a first duration, it is recorded at a second time instance that the duration that the first preset relationship is held between the first electronic device and the second electronic device is a second duration, and it is recorded at a third time instance that the duration that the first preset relationship is held between the first electronic device and the second electronic device is a third duration, where the third time instance is the closest to the current time instance, and the first time instance is the furthest from the current time instance. If the weight of the first duration is 0.2, the weight of the second duration is 0.3, and the weight of the third duration is 0.5, then the calculated weight-averaged duration of the first preset relationship is: the first duration*0.2+the second duration*0.3+and the third duration*0.5.

In another example, the first preset condition is that the number of times that the first preset relationship is recorded reaches the preset number of times, and the number of times is 1 for each time the first preset relationship is recorded, but a different weight is set for each recorded number of times. The number of times of the first preset relationship recorded at different time instances is weight-averaged by the weights corresponding to the records of the first preset relationship, and it is judged whether the weight-averaged number of times reaches the preset number of times by comparison. For example, the first preset relationship between the first electronic device and the second electronic device is detected respectively at a first time instance, a second time instance and a third time instance, where the third time instance is the closest to the current time instance, and the first time instance is the furthest from the current time instance. Also if the weight corresponding to the number of times of the first preset relationship detected at the first time instance is 0.2, the weight corresponding to the number of times of the first preset relationship detected at the second time instance is 0.3, and the weight corresponding to the number of times of the first preset relationship detected at the third time instance is 0.5, then the numbers of times of the first preset relationship are weight-averaged into the number of times of: 1* 0.2+1*0.3+1*0.5.

Figure 2:
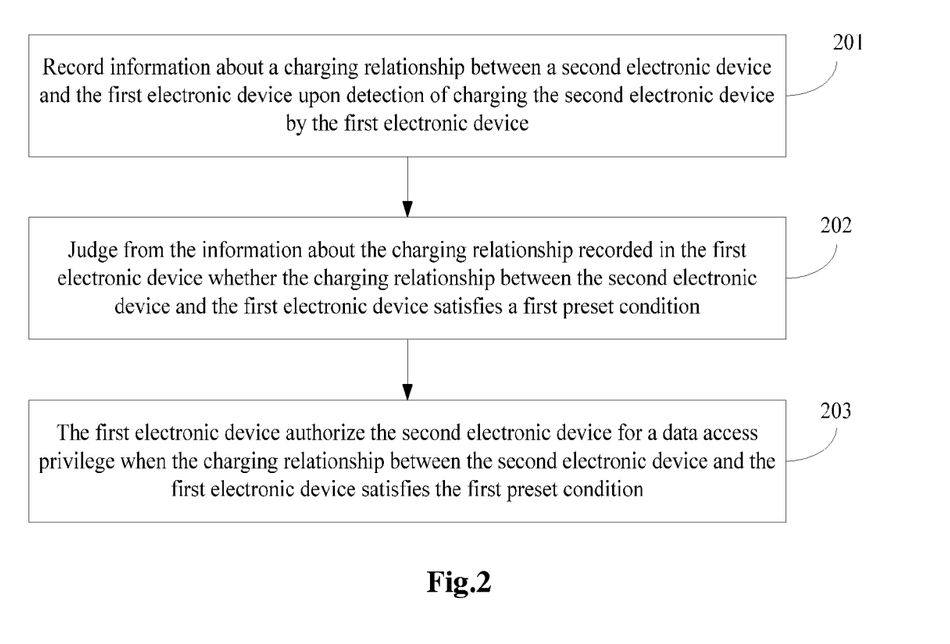
FIG. 2 illustrates a schematic flow chart of another embodiment of an information processing method according to the disclosure.

Referring to FIG. 2, a schematic flow chart of an embodiment of an information processing method according to the disclosure is illustrated. The method according to this embodiment is applicable to a first electronic device which can be a mobile phone, a PAD, a notebook computer, a desktop computer, etc. The method according to this embodiment includes steps 201 to 203.

The step 201 is to record information about a relationship of charging between a second electronic device and the first electronic device upon detection of charging the second electronic device by the first electronic device.

In this embodiment, the case that the second electronic device is charged by the first electronic device is taken as an example of the second electronic device occupying a resource of the first electronic device. The second electronic device can be an electronic device of the same type as the first electronic device or can be an electronic device of a different type.

The second electronic device can be charged by the first electronic device in any existing way of being charged by another electronic device, and this will not be limited here. For example, the second electronic device can be charged by being connected with a USB interface of the first electronic device through a data line, for example, a mobile phone is charged by being connected with a USB interface of a computer through a USB data line. In another example, the second electronic device can alternatively be changed wirelessly by magnetic resonance for transmission of power over the air between the first electronic device and the second electronic device.

The first electronic device can record the information about the charging relationship between the second electronic device and the first electronic device by recording only information about the second electronic device and information that a current first preset relationship is the charging relationship. The recorded information about the charging relationship can also be recorded information about one or more of a starting time instance, an ending time instance, a charging duration, the amount of charged power, etc., for the current charging of the second electronic device by the first electronic device.

The step 202 is to judge from the information about the charging relationship recorded in the first electronic device whether the charging relationship between the second electronic device and the first electronic device satisfies a first preset condition.

The step 203 is to authorize the second electronic device by the first electronic device for a data access privilege when the charging relationship between the second electronic device and the first electronic device satisfies the first preset condition.

The first preset condition can be the same condition as described in the foregoing embodiment. Specifically it can be judged whether the charging relationship between the second electronic device and the first electronic device satisfies the first preset condition by judging whether the number of times that the second electronic device is charged by the first electronic device reaches a preset number of times. Accordingly, the second electronic device is authorized for the data access privilege when the number of times that the second electronic device is charged by the first electronic device reaches the preset number of times.

When the information about the charging relationship recorded in the first electronic device includes a charging duration each time the second electronic device is charged by the first electronic device, it can be further judged whether the charging duration for which the second electronic device is charged by the first electronic device reaches a preset duration. Accordingly, the second electronic device is authorized for the data access privilege when the charging duration for which the second electronic device is charged by the first electronic device reaches the preset duration.

Furthermore, in this embodiment, the amount of power obtained by the second electronic device in the charging by the first electronic device can be further judged from the information about the charging relationship recorded in the first electronic device. The second electronic device is authorized for the data access privilege upon judging that the amount of power obtained by the second electronic device in the charging by the first electronic device reaches a preset amount of power.

In this embodiment, the first electronic device authorizes the second electronic device for the data access privilege in the same way as described previously so long as the second electronic device can have the privilege to be capable of accessing data in the first electronic device.

In this embodiment, the cases that in a practical application, electronic devices of the same user, the same family or the same department can charge each other, possibly for a large number of times, a long charging duration or a high amount of charged power and generally data may need to be shared between the electronic devices of the same user, the same family or the same department are considered, and with the solution according to this embodiment, the electronic devices can authorize each other conveniently for a data access privilege without any manual registration or setting by the user, thereby lowering the complexity of data access.

FIG. 2 illustrates the second electronic device being charged by the first electronic device by way of an example, but in a practical application, the second electronic device can alternatively occupy a resource of the first electronic device in numerous ways. For example, it is detected that the second electronic device outputs an image using a display unit of the first electronic device, and information about the use of the first electronic device by the second electronic device to output image data is recorded. In other words, the second electronic device extends the display unit of the first electronic device to an image output interface of the second electronic device, for example, the second electronic device transmits image data to the first electronic device and instructs the first electronic device to output the image data into the display unit of the first electronic device.

It can be judged, from the recorded information about the use of the display unit of the first electronic device by the second electronic device to output an image, whether the number of times that the second electronic device outputs an image using the display unit of the first electronic device reaches a preset number of times, and if the preset number of times is reached, then the first electronic device authorizes the second electronic device for the data access privilege so that the second electronic device has the privilege to access the data in the first electronic device.

Similar to the embodiment in FIG. 2, it can be further judged, from the information recorded by the first electronic device, whether the total duration for which the second electronic device outputs an image using the display unit of the first electronic device reaches a preset duration, and if the preset duration is reached, then the first electronic device authorizes the second electronic device for the data access privilege.

In another example, occupancy of a resource of the first electronic device by the second electronic device can alternatively be detected by detecting an access of the second electronic device to a first storage sub-space in a storage space of the first electronic device, where the first storage sub-space is a part of the storage space. The first storage sub-space can be a storage space in the first electronic device, authorized to the second electronic device for an access. An access action of the second electronic device is recorded when the first electronic device detects an access of the second electronic device to the first storage sub-space. Accordingly, the first preset condition can be preset that the number of accesses reaches a preset number; or that the amount of data retrieved from the first storage sub-space reaches a preset amount; or that the total duration of accesses to the first storage sub-space reaches a preset duration. Of course, the first preset condition can alternatively include two or three of the foregoing three conditions.

Accordingly, if it is judged that the number of accesses of the second electronic device to the first storage sub-space reaches the preset number, or that the total duration of accesses of the second electronic device to the first storage sub-space reaches the preset duration, or that the amount of data retrieved by the second electronic device from the first storage sub-space reaches the preset amount, the second electronic device will be authorized for the access privilege, so that the second electronic device can access the entire storage space of the first electronic device. Of course, the second electronic device can alternatively be authorized for the data access privilege if two or more of these several conditions that the number of accesses reaches the preset number, that the total duration of accesses reaches the preset duration and that the amount of data retrieved from the first storage sub-space reaches the preset amount are satisfied.

In analogy to the first preset charging being the charging relationship, in a practical application, only if the first electronic device and the second electronic device are in the same family or the same department or associated somehow, the user of the first electronic device will allow the second electronic device to use the display interface of the first electronic device as an extended interface to display an output image of the second electronic device; or the first electronic device will allow a continuous access of the second electronic device to the first storage sub-space. Thus if the recorded first preset relationship satisfies the first preset condition, then it indicates the frequent interaction of the first electronic device with the second electronic device and a high probability of an access of the second electronic device to the data in the first electronic device, and the second electronic device can be authorized for the data access privilege, so as to omit the registration, log-in or other complicated operations for the second electronic device when accessing the data of the first electronic device.

In any of the foregoing embodiments, the second electronic device in need of accessing the first electronic device can send a data access request directly to the first electronic device after the first electronic device authorizes the second electronic device for the data access privilege. The first electronic device determines that the second electronic device is authorized for the data access privilege and can accept the data access request directly upon reception of the data access request.

As can be appreciated, in any of the foregoing embodiments, the first electronic device can also send the recorded information about the first preset relationship to the second electronic device while the first electronic device authorizes the second electronic device for the data access privilege so that the second electronic device authorizes the first electronic device for a data access privilege upon judging that the recorded first preset relationship satisfies the first preset condition.

Of course, the first electronic device can also send an indication message to the second electronic device while the first electronic device authorizes the second electronic device for the data access privilege so that the second electronic device authorizes the first electronic device for a data access privilege Furthermore, the authorization may be passed between the second electronic device and the first electronic device.

Figure 3:
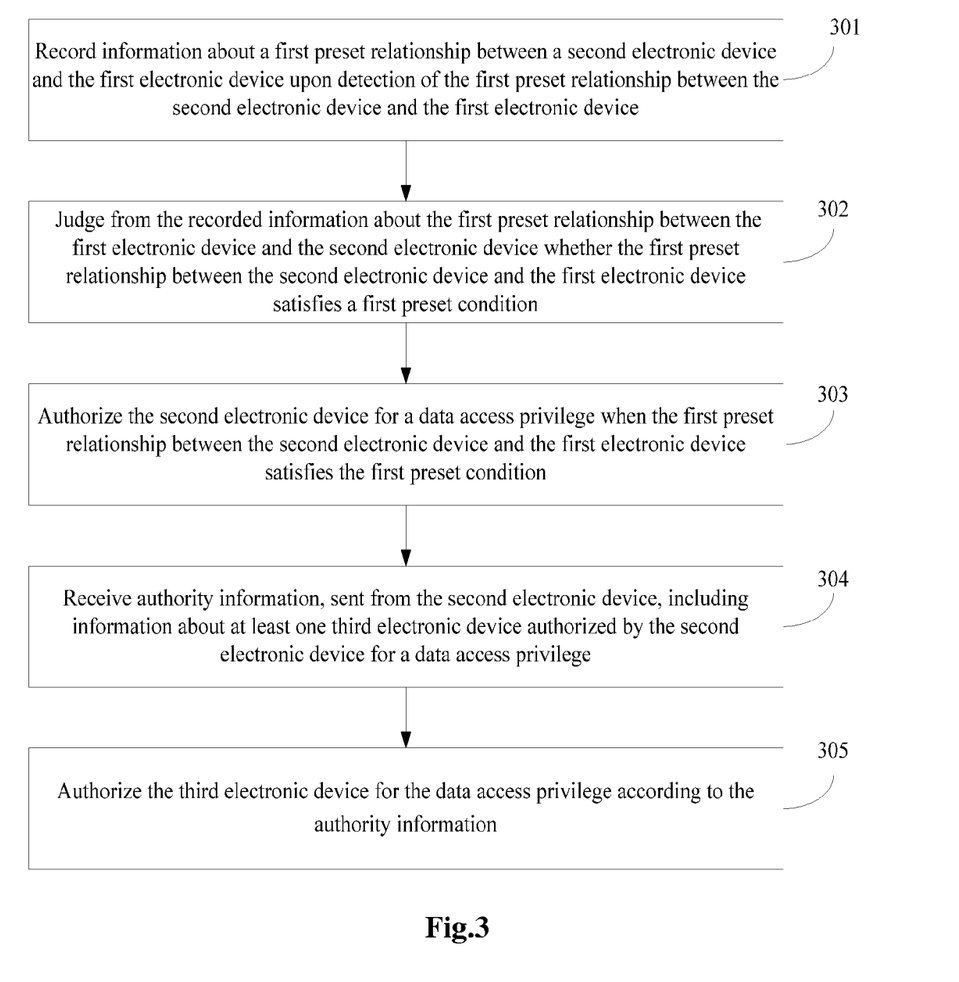
FIG. 3 illustrates a schematic flow chart of still another embodiment of an information processing method according to the disclosure.

Referring to FIG. 3, a schematic flow chart of another embodiment of an information processing method according to the disclosure is illustrated. The method according to this embodiment is applicable to a first electronic device which can be a mobile phone, a PAD, a notebook computer, a desktop computer, etc. The method according to this embodiment includes steps 301 to 305.

The step 301 is to record information about a first preset relationship between a second electronic device and the first electronic device upon detection of the first preset relationship between the second electronic device and the first electronic device.

The first electronic device can have a second preset relationship with the second electronic device, and the second preset relationship is a connection established by the second electronic device with the first electronic device upon being authorized by the first electronic device for a data access.

The first preset relationship is different from the second preset relationship.

The step 302 is to judge from the recorded information about the first preset relationship between the first electronic device and the second electronic device whether the first preset relationship between the second electronic device and the first electronic device satisfies a first preset condition.

The step 303 is to authorize the second electronic device for a data access privilege when the first preset relationship between the second electronic device and the first electronic device satisfies the first preset condition.

Reference can be made to the relevant description of the foregoing embodiment for details of the step 301 to the step 303, and a repeated description thereof will be omitted here.

The step 304 is to receive authorization information, sent from the second electronic device, including information about at least one third electronic device authorized by the second electronic device for a data access privilege.

The authorization information includes information about the third electronic device authorized by the second electronic device for the data access privilege. There may be one or more third electronic devices.

The second electronic device can authorize the third electronic device for the data access privilege also as described previously. For example, an association relationship between the second electronic device and the third electronic device can be included in the second electronic device, and the association relationship is used to indicate that the third electronic device has the privilege to access data in the second electronic device. The second electronic device can send the stored association relationship to the first electronic device.

The step 305 is to authorize the third electronic device for the data access privilege according to the authorization information.

The first electronic device authorizes the third electronic device included in the authorization information for the data access privilege according to the authorization information.

In a practical application, the third electronic device capable of accessing data of the second electronic device can also access the data originally stored in the first electronic device if the second electronic device satisfies the condition for being authorized by the first electronic device for the data access privilege.

With the pass of the authorization information, the third electronic device can have a privilege to access data in the first electronic device.

Figure 4:
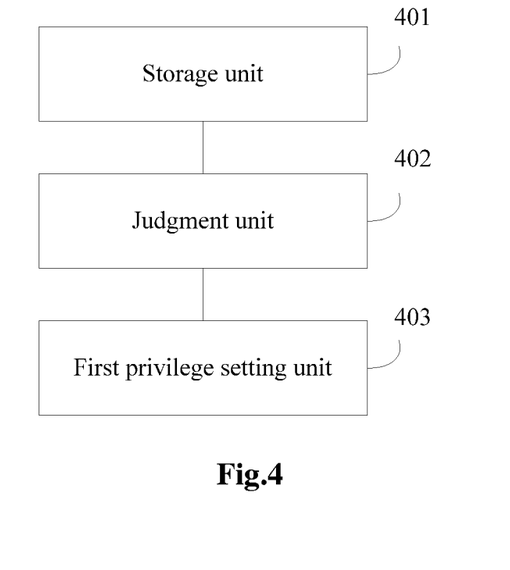
FIG. 4 illustrates a schematic structural diagram of an embodiment of an information processing apparatus according to the disclosure.

In correspondence to the methods according to the disclosure, the disclosure further provides an information processing apparatus. Referring to FIG. 4, a schematic structural diagram of an embodiment of an information processing apparatus according to the disclosure is illustrated. The apparatus according to this embodiment is applicable to a first electronic device which can be a computer, a PAD, a mobile phone, etc. The apparatus according to this embodiment includes a storage unit 401, a judgment unit 402, and a first privilege setting unit 403.

The storage unit 401 is configured to record information about a first preset relationship between a second electronic device and the first electronic device upon detection of the first preset relationship between the second electronic device and the first electronic device, where the first electronic device can have a second preset relationship with the second electronic device, and the second preset relationship is a connection established by the second electronic device with the first electronic device upon being authorized by the first electronic device for a data access; and the first preset relationship is different from the second preset relationship.

The judgment unit 402 is configured to judge from the recorded information about the first preset relationship between the first electronic device and the second electronic device whether the first preset relationship between the second electronic device and the first electronic device satisfies a first preset condition.

The first privilege setting unit 403 is configured to authorize the second electronic device for a data access privilege when the first preset relationship between the second electronic device and the first electronic device satisfies the first preset condition so that the second electronic device has a privilege to access data in the first electronic device.

The first privilege setting unit can include:

A first privilege setting sub-unit configured to, in a case that the first preset relationship between the second electronic device and the first electronic device satisfies the first preset condition, create an association relationship between the first electronic device and the second electronic device and store the association relationship, where the association relationship is used to indicate that the second electronic device has the privilege to access the data in the first electronic device.

Optionally, the storage unit 401 can include:

a storage sub-unit configured to record information about occupancy of a resource of the first electronic device by the second electronic device upon detection occupancy of the resource of the first electronic device by the second electronic device.

In view of that the second electronic device can occupy a resource of the first electronic device in numerous ways, the storage sub-unit accordingly can include any one or more of:

a first storage sub-unit configured to record information about charging the second electronic device by the first electronic device upon detecting that the second electronic device is charged by the first electronic device;

a second storage sub-unit configured to record information about the use of a display unit of the first electronic device by the second electronic device to output an image upon detecting that the second electronic device outputs an image using the display unit of the first electronic device; and a third storage sub-unit configured to record information about an access of the second electronic device to a first indicated storage sub-space in a storage space of the first electronic device upon detection of the access of the second electronic device to the first storage sub-space in the first electronic device, where the first storage sub-space is a part of the storage space.

The first preset condition preset in the judgment unit may vary as the second electronic device occupies a different resource of the first electronic device. The judgment unit can include:

a judgment sub-unit configured to judge from the recorded information about the first preset relationship between the first electronic device and the second electronic device whether the duration that the first preset relationship is held between the second electronic device and the first electronic device reaches a preset duration; and/or whether the number of times that the first preset relationship is held between the second electronic device and the first electronic device reaches a preset number of times; and/or whether the amount of resources obtained by the second electronic device from the first electronic device while the first preset relationship is held between the second electronic device and the first electronic device reaches a preset value.

Furthermore, the information processing apparatus according to the disclosure can further include:

a reception unit configured to receive authorization information, sent from the second electronic device, including information about at least one third electronic device authorized by the second electronic device for a data access privilege; and a second privilege setting unit configured to authorize the third electronic device for the data access privilege according to the authorization information.

The respective embodiments have been described progressively in this description, and each of the embodiments has been focused upon its differences from the other embodiments, so reference can be made to each other for those identical or similar points among the respective embodiments. For the apparatus disclosed according to an embodiment, it corresponds to its method disclosed according to an embodiment, so the description thereof has been simplified, and reference can be made to the relevant disclosure of the method for their relevant points.

The foregoing description of the disclosed embodiments enables those skilled in the art to make or use the disclosure. Numerous modifications to these embodiments will be obvious to those skilled in the art, and the general principle as defined in this description can be put into practice in other embodiments without departing from the spirit and scope of the disclosure. Accordingly, the disclosure will not be limited to these embodiments disclosed in this description but shall be accorded the broadcast scope consistent with the principle and novel characteristics disclosed in this description.

The invention claimed is:

1. An information processing method, comprising:
recording, by a first electronic device, information about charging a second electronic device by the first electronic device;
wherein the first electronic device is capable of forming a second relationship with the second electronic device, which is a connection established by the second electronic device with the first electronic device upon being authorized by the first electronic device for data access;
determining, by the first electronic device, from the recorded information about charging the second electronic device by the first electronic device, whether the amount of power obtained by the second electronic device from the first electronic device reaches a value; and
authorizing, by the first electronic device, the second electronic device for a data access privilege in a case that the amount of power obtained by the second electronic device from the first electronic device reaches the value, so that the second electronic device has the privilege to access data in the first electronic device.

2. The method according to claim 1, wherein the method further comprises, before the authorizing, by the first electronic device, the second electronic device for a data access privilege, at least one of:
determining whether a duration in which the second electronic device is charged by the first electronic device reaches a value, wherein the duration is a total length of time for charging the second electronic device by the first electronic device; and
determining whether the number of times that the second electronic device is charged by the first electronic device reaches a value, wherein the number of times are total occurrences of charging the second electronic device by the first electronic device.

3. The method according to claim 1, further comprising:
receiving, by the first electronic device, authorization information sent from the second electronic device, the authorization information comprising information about at least one third electronic device authorized by the second electronic device for a data access privilege; and authorizing, by the first electronic device, the third electronic device for the data access privilege according to the authorization information.

4. The method according to claim 1, wherein the authorizing, by the first electronic device, the second electronic device for the data access privilege comprises:

creating, by the first electronic device, an association relationship between the first electronic device and the second electronic device and storing the association relationship, wherein the association relationship is used to indicate that the second electronic device has the privilege to access the data in the first electronic device.

5. The method according to claim 3, wherein the authorizing, by the first electronic device, the second electronic device for the data access privilege comprises:

creating, by the first electronic device, an association relationship between the first electronic device and the second electronic device and storing the association relationship, wherein the association relationship is used to indicate that the second electronic device has the privilege to access the data in the first electronic device.

6. An information processing apparatus, comprising:
a processor;
a storage that stores programs executable by the processor to:
record information about charging a second electronic device by a first electronic device;
wherein the first electronic device is capable of forming a second relationship with the second electronic device, which is a connection established by the second electronic device with the first electronic device upon being authorized by the first electronic device for data access;
determine, from the recorded information about charging the second electronic device by the first electronic device, whether the amount of power obtained by the second electronic device from the first electronic device reaches a value; and
authorize the second electronic device for a data access privilege in a case that the amount of power obtained by the second electronic device from the first electronic device reaches the value, so that the second electronic device has a privilege to access data in the first electronic device.

7. The apparatus according to claim 6, wherein the processor is further configured to determine from the recorded information about charging the second electronic device by the first electronic device:

whether a duration in which the second electronic device is charged by the first electronic device reaches a value, wherein the duration is a total length of time for charging the second electronic device by the first electronic device; and whether the number of times that the second electronic device is charged by the first electronic device reaches a value, wherein the number of times are total occurrences of charging the second electronic device by the first electronic device.

8. The apparatus according to claim 6, wherein the processor is further configured to:

receive authorization information sent from the second electronic device, the authorization information comprising information about at least one third electronic device authorized by the second electronic device for a data access privilege; and authorize the third electronic device for the data access privilege according to the authorization information.

9. The apparatus according to claim 6, wherein the processor is further configured to, in a case that the amount of power obtained by the second electronic device from the first electronic device reaches a value, create an association relationship between the first electronic device and the second electronic device and store the association relationship, wherein the association relationship is used to indicate that the second electronic device has the privilege to access the data in the first electronic device.

10. The apparatus according to claim 8, wherein the processor is further configured to, in a case that the amount of the power obtained by the second electronic device from the first electronic device reaches a value, create an association relationship between the first electronic device and the second electronic device and store the association relationship, wherein the association relationship is used to indicate that the second electronic device has the privilege to access the data in the first electronic device.

* * * * *